(No Model.)
W. H. NELSON.
CUTTING TOOL.
No. 528,787. Patented Nov. 6, 1894.
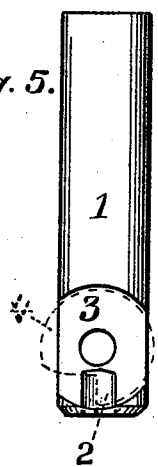
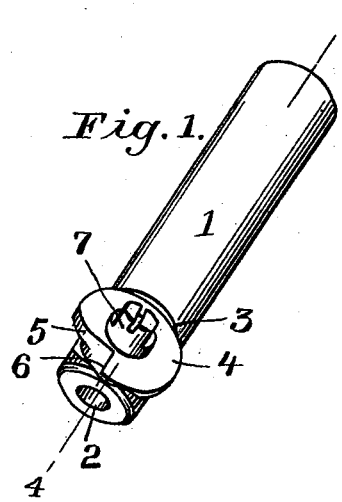
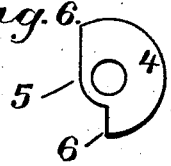
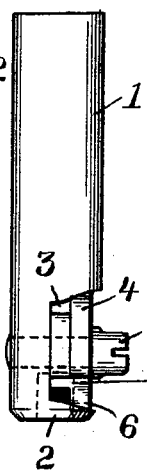
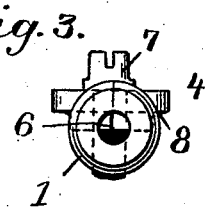
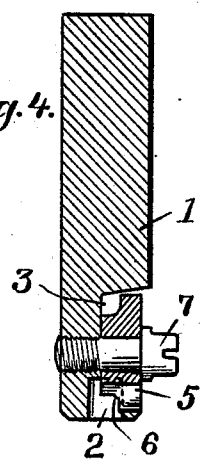
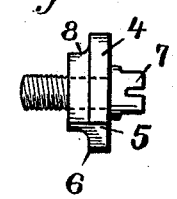
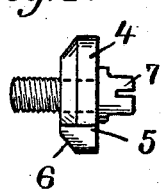
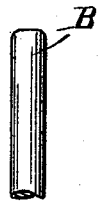
Witnesses
Richard Williams
Geo. D. Phillips
Inventor
WILLIAM H. NELSON
By C. M. Newman
Attorney
THE NORRIS PETERS CO., PHOTO-LITHO., WASHINGTON, D. C.

UNITED STATES PATENT OFFICE.

WILLIAM H. NELSON, OF WATERBURY, CONNECTICUT.

CUTTING-TOOL.

SPECIFICATION forming part of Letters Patent No. 528,787, dated November 6, 1894.

Application filed May 1, 1894. Serial No. 509,692. (No model.)

*To all whom it may concern:*

Be it known that I, WILLIAM H. NELSON, a citizen of the United States, and a resident of Waterbury, in the county of New Haven and State of Connecticut, have invented certain new and useful Improvements in Cutting-Tools, of which the following is a specification.

My invention relates to rotary cutters and particularly to that class of cutters known as quill cutters, and is designed to be used in connection with any ordinary rotary head such for instance as that of a lathe or boring mill. It may rotate or may be held stationary and the stock rotate within.

The purpose of this device is to turn the ends of wires, studs, screws, &c., of a uniform size and of various forms and shapes; the special objects being to produce a cutter which will turn out work in large quantities exact duplicates of one another, and further to produce a cutting edge which may be sharpened and replaced a number of times without resetting the tool, and which will produce exactly the same cut after being sharpened.

The tool may be made of various sizes and the cutter set at any angle to give the correct clearance according to the work.

In the accompanying drawings, which form a part of this specification, Figure 1 shows a perspective view of my novel cutter. Fig. 2 is a side view. Fig. 3 is a bottom end view. Fig. 4 is a section on a line 4—4 of Fig. 1. Fig. 5 shows an elevation of the tool, having the cutter removed. Fig. 6 is a detached plan view of a cutter which has been partially ground away. Figs. 7 and 8 are detached face views of modified forms of cutters.

Similar numerals and letters of reference denote like parts in all of the figures of the drawings.

This improved device is particularly designed for beveling the ends of wire, milling, shanks, &c., and is applicable to any form of rotary head, having a bore to receive a cutting tool and means for securing the same, or may be held stationary while the stock is rotated within it.

1 denotes a quill or holder and is adapted to be securely held in any suitable head. In the lower extremity of this quill is a bore 2 which serves as a guide for the stock to be operated upon and may be of any desired depth required. Upon one side and at the lower end of the quill I remove a portion of the stock, forming a recess 3 which in practice extends into the bore 2. (See Figs. 2, 4 and 5.) Within the recess 3 is secured a cutter 4 which is circular in formation, having a cut-away portion 5 forming cutting edges 6 upon its periphery and at one side. This cutter is secured to the quill and at a right angle to the center thereof by means of a screw 7, as clearly appears in the drawings. The cutter 6 is flat upon its outer face, while the inner surface may be cut away, as shown at 8, forming any desired angle or oval.

The several specimens of work indicated by A, B, C and D as will be seen are the productions respectively of the cutters shown in Figs. 2, 4, 7 and 8. The operation in each instance would be the same, the only difference being in the formation of the inner edge of the cutter, which, as shown in each instance, is slightly different, and any one of these may be removed from the quill, ground and reset with precisely the same result as before.

This tool is designed to treat a large range of work, both as to size and formation. In each instance, however, the size of the bore 2 would necessarily be the same as that of the stock to be operated upon, and the cutter adjusted according to the clearance desired. It will also be understood that the quill once set need not be disturbed.

Having thus described my invention, I claim—

In a quill cutter of the class described the combination with a quill having a bore in the base thereof forming a guide, and a recess extending into said bore from one side provided with concave shoulders, at the top and bottom of the recess, a detachable cutter secured within said recess the axis of which is transverse to that of the quill and guide, and the periphery thereof engaging the before mentioned concave walls, the whole arranged as specified.

Signed at Waterbury, in the county of New Haven and State of Connecticut, this 26th day of April, A. D. 1894.

WILLIAM H. NELSON.

Witnesses:
 WILSON H. PIERCE,
 ROBERT E. HALL.